(12) United States Patent  (10) Patent No.: US 8,842,196 B2
Ozaki  (45) Date of Patent: Sep. 23, 2014

(54) DATA RECORDING APPARATUS AND CAMERA CONFIGURED TO SELECTIVELY PROCESS DATA STORED IN A RECORDING MEDIUM

(71) Applicant: Nikon Corporation, Tokyo (JP)
(72) Inventor: Koji Ozaki, Yokohama (JP)
(73) Assignee: Nikon Corporation, Tokyo (JP)
( * ) Notice: Subject to any disclaimer, the term of this patent is extended or adjusted under 35 U.S.C. 154(b) by 0 days.
(21) Appl. No.: 14/031,579
(22) Filed: Sep. 19, 2013
(65) Prior Publication Data
US 2014/0022413 A1 Jan. 23, 2014

Related U.S. Application Data

(63) Continuation of application No. 13/067,754, filed on Jun. 23, 2011, now abandoned, which is a continuation of application No. 12/216,910, filed on Jul. 11, 2008, now abandoned.

(30) Foreign Application Priority Data

Jul. 13, 2007  (JP) .................................. 2007-184321
Jul. 8, 2008   (JP) .................................. 2008-177972

(51) Int. Cl.
H04N 5/76    (2006.01)
H04N 5/222   (2006.01)
H04N 1/21    (2006.01)
H04N 1/00    (2006.01)
H04N 9/79    (2006.01)
H04N 5/232   (2006.01)
H04N 5/77    (2006.01)
H04N 5/907   (2006.01)
H04N 101/00  (2006.01)

(52) U.S. Cl.
CPC .................. *H04N 9/79* (2013.01); *H04N 5/907* (2013.01); *H04N 2101/00* (2013.01); *H04N 2201/212* (2013.01); *H04N 1/2125* (2013.01); *H04N 1/2158* (2013.01); *H04N 1/00472* (2013.01); *H04N 2201/218* (2013.01); *H04N 1/00482* (2013.01); *H04N 1/00458* (2013.01); *H04N 9/7921* (2013.01); *H04N 2201/214* (2013.01); *H04N 1/00427* (2013.01); *H04N 1/00453* (2013.01); *H04N 1/2112* (2013.01); *H04N 5/23293* (2013.01); *H04N 1/00461* (2013.01); *H04N 5/772* (2013.01); *H04N 5/232* (2013.01)
USPC .................................. 348/231.1; 348/333.01

(58) Field of Classification Search
USPC .................. 348/231.1–231.9, 333.01–333.12
See application file for complete search history.

(56) References Cited

U.S. PATENT DOCUMENTS 5,764,800 A  6/1998 Yamagata
6,122,411 A  9/2000 Shen et al.
(Continued)

FOREIGN PATENT DOCUMENTS

JP  A-8-331498   12/1996
JP  A-2004-23617  1/2004
(Continued)

OTHER PUBLICATIONS

Jun. 19, 2012 Notification of Reasons for Refusal issued in Japanese Patent Application No. 2008-177972 (with English-language translation).
(Continued)

*Primary Examiner* — Tuan Ho
*Assistant Examiner* — Selam Gebriel
(74) *Attorney, Agent, or Firm* — Oliff PLC

(57) ABSTRACT

A data recording apparatus includes: a data recording device that records acquired data in a recording medium; a target data specifying device that specifies target data to which data processing is to be performed out of data recorded in the recording medium based on an instruction by a user; a recordable data number calculation device that calculates a number of the acquired data that will be able to be recorded in the recording medium by performing the data processing to the target data based on a remaining capacity of the recording medium and a content of processing of the data processing; a display control device that displays on a display device a result of the calculation by the recordable data number calculation device before the data processing is performed.

8 Claims, 10 Drawing Sheets

(56) References Cited

U.S. PATENT DOCUMENTS

| | | | |
|---|---|---|---|
| 6,885,395 B1 * | 4/2005 | Rabbani et al. | 348/231.1 |
| 7,218,345 B2 | 5/2007 | Hatano | |
| 7,277,131 B2 | 10/2007 | Wakabayashi | |
| 7,800,679 B2 | 9/2010 | Wakabayashi | |
| 2003/0077064 A1 | 4/2003 | Katayama | |
| 2003/0095195 A1 | 5/2003 | Iwauchi | |
| 2004/0028377 A1 | 2/2004 | Inakura | |
| 2004/0090539 A1 | 5/2004 | Kim et al. | |
| 2004/0105018 A1 | 6/2004 | Takahashi et al. | |
| 2005/0117030 A1 | 6/2005 | Kim | |
| 2007/0041030 A1 | 2/2007 | Kojima | |

FOREIGN PATENT DOCUMENTS

| | | |
|---|---|---|
| JP | A-2004-193642 | 7/2004 |
| JP | A-2005-175950 | 6/2005 |
| JP | A-2006-187035 | 7/2006 |
| JP | A-2007-53537 | 3/2007 |

OTHER PUBLICATIONS

May 15, 2012 Office Action in U.S. Appl. No. 13/067,754.

Mar. 19, 2013 Office Action in U.S. Appl. No. 13/067,754.

* cited by examiner

FIG.2

*UNIT[MB]

| | L | M | S |
|---|---|---|---|
| RAW | 11 | – | – |
| FINE | 7.3 | 4.1 | 1.9 |
| NORM | 3.7 | 2.1 | 1.0 |
| BASIC | 1.9 | 1.1 | 0.6 |
| RAW+BASIC | 12.9 | 12.1 | 11.6 |

FIG.4A

*UNUSED CAPACITY ABOUT 256MB     *UNIT (FRAME)

|  | L | M | S |
|---|---|---|---|
| RAW | 20 | – | – |
| FINE | 33 | 58 | 125 |
| NORM | 64 | 111 | 229 |
| BASIC | 125 | 216 | 389 |
| RAW+BASIC | 19 | 21 | 22 |

FIG.4B

*UNUSED CAPACITY ABOUT 25MB     *UNIT (FRAME)

|  | L | M | S |
|---|---|---|---|
| RAW | 2 | – | – |
| FINE | 3 | 6 | 13 |
| NORM | 6 | 11 | 23 |
| BASIC | 13 | 22 | 39 |
| RAW+BASIC | 1 | 2 | 2 |

FIG.9

*UNUSED CAPACITY ABOUT 120 MB          *UNIT [FRAME]

|      | L   | M   | S   |
|------|-----|-----|-----|
| FINE | 112 | 115 | 118 |
| NORM | 116 | 117 | 119 |
| BASIC| 118 | 118 | 119 |

US 8,842,196 B2

DATA RECORDING APPARATUS AND CAMERA CONFIGURED TO SELECTIVELY PROCESS DATA STORED IN A RECORDING MEDIUM

This is a Continuation of U.S. patent application Ser. No. 13/067,754 filed Jun. 23, 2011, which is a Continuation of U.S. patent application Ser. No. 12/216,910 filed Jul. 11, 2008. The disclosure of each of these prior applications is incorporated herein by reference in its entirety.

INCORPORATION BY REFERENCE

The disclosures of the following priority applications are herein incorporated by reference:
Japanese Patent Application No. 2007-184321 filed Jul. 13, 2007
Japanese Patent Application No. 2008-177972 filed Jul. 8, 2008

BACKGROUND OF THE INVENTION

1. Field of the Invention

The present invention relates to a data recording apparatus and to a camera.

2. Description of Related Art

The following image recording device is known. The image recording apparatus disclosed in Japanese Laid-open Patent Publication No. 2006-187035 determines a data amount reduction remaining force of each image data and performs data amount reduction processing on image data determined to have a large reduction remaining force to increase an unused capacity of the recording medium.

However, the conventional image recording apparatus performs data amount reduction processing on image data that have been determined to have large data amount reduction remaining forces, so that the user cannot know before image processing is performed as to how much data of image will be recorded in the recording medium.

SUMMARY OF THE INVENTION

The data recording apparatus according to a first aspect of the present invention includes: a data recording device that records acquired data in a recording medium; a target data specifying device that specifies a target data to which data processing is to be performed out of data recorded in the recording medium based on an instruction by a user; a recordable data number calculation device that calculates a number of the acquired data that will be able to be recorded in the recording medium by performing the data processing to the target data based on a remaining capacity of the recording medium and a content of processing of the data processing; and a display control device that displays on a display device a result of the calculation by the recordable data number calculation device before the data processing is performed.

According to a second aspect of the present invention, the data processing in the data recording apparatus according to the first aspect preferably includes data deletion processing in which the target data is deleted from the recording medium.

According to a third aspect of the present invention, the data processing in the data recording apparatus according to the first aspect may include data creating processing in which new data is created based on the target data and recorded in the recording medium.

According to a fourth aspect of the present invention, the data processing in the data recording apparatus according to the second aspect may further include data creating processing in which new data is created based on the target data and recorded in the recording medium.

According to a fifth aspect of the present invention, the data recording apparatus according to the second aspect is preferably as follows. The data recording device performs processing to the acquired data such that data size (acquired data size) of the acquired data matches a data size that corresponds to preset data acquisition conditions and records the resultant data in the recording medium, the target data specifying device specifies deletion target data to be deleted out of the data recorded in the recording medium based on an instruction by the user, the data recording apparatus further includes: a data size acquisition device that acquires data size (deleted data size) of the deletion target data specified by the deletion target data specifying device, the recordable data number calculation device calculates a number of the acquired data that will be able to be recorded in the recording medium by deletion of the deletion target data based on a remaining capacity of the recording medium, the deleted data size, and the acquired data size, and the display control device displays a result of the calculation by the recordable data number calculation device on the display device before the data deletion processing is performed.

According to a sixth aspect of the present invention, the data recording apparatus according to the fifth aspect may further include: a data acquisition condition setting device that sets data acquisition conditions for acquiring the acquired data, wherein the recordable data number calculation device calculates the recordable data number for each of the data acquisition conditions set by the data acquisition condition setting device, and the display control device displays on the display device a result of the calculation by the recordable data number calculation device.

According to a seventh aspect of the present invention, in the data recording apparatus according to the sixth aspect, when one of the recordable data numbers for respective data acquisition conditions displayed on the display device by the display control device is selected by the user, the data acquisition condition setting device may delete the deletion target data from the recording medium and may set data acquisition conditions corresponding to the recordable data number selected by the user as data acquisition conditions of the data recording device.

According to an eighth aspect of the present invention, the data recording apparatus according to the fifth aspect may be configured such that the deletion target data specifying device specifies a plurality of deletion target data to be deleted out of the data recorded in the recording medium based on an instruction by the user, the recordable data number calculation device calculates the recordable data number of the data that will be able to be recorded in the recording medium by deletion of the deletion target data based on a remaining capacity of the recording medium, the data sizes of the plurality of deletion target data, and the acquired data size, and the display control device displays a result of the calculation by the recordable data number calculation device on the monitor device.

According to a ninth aspect of the present invention, the display control device in the data recording apparatus according to the fifth aspect preferably displays on the display device a number of the acquired data that can be recorded in the recording medium before the deletion target data is deleted along with the result of the calculation by the recordable data number calculation device.

In the data recording apparatus according to a tenth aspect of the present invention, the recordable data number calculation device may calculate a number of recordable data that will be able to be recorded in the recording medium after the new data is recorded based on a remaining capacity of the recording medium and a data size of the new data to be created by the data creation processing, and the display control device may display on the display device a result of the calculation by the recordable data number calculation device before the data creation processing is performed.

According to an eleventh aspect of the present invention, it is preferred in the data recording apparatus according to the tenth aspect that the recordable data number calculation device calculates a number of recordable data that will be able to be recorded in the recording medium after the new data is recorded based on a remaining capacity of the recording medium and a data size of the new data to be created by the data creation processing, and the display control device displays on the display device a result of the calculation by the recordable data number calculation device before the data creation processing is performed.

According to a twelfth aspect of the present invention, it is preferred in the data recording apparatus according to the tenth aspect that the display control device displays on the display device a number of the acquired data that can be recorded in the recording medium before the data creation processing is performed along with the result of the calculation by the recordable data number calculation device.

The camera according to a thirteenth aspect of the present invention includes a data recording apparatus according to the fifth aspect, and an image data acquisition device that captures an image of a subject to acquire image data, wherein the data recording device performs processing to data acquired by the image data acquisition device such that a data size thereof matches a data size that corresponds to preset data acquisition conditions and records the resultant data in the recording medium as the acquired data.

The camera according to a fourteenth aspect of the present invention includes a data recording apparatus according to the tenth aspect, and an image data acquisition device that captures an image of a subject to acquire image data, wherein the data recording device records image data acquired by the image data acquisition device in the recording medium as the acquired data, and by the data creation processing predetermined image processing is performed on the target data to create new image data as the new data and records it in the recording medium.

BRIEF DESCRIPTION OF THE DRAWINGS

FIG. 2 shows specific examples of file size according to the recording format, image quality, and image size of the image;

FIGS. 4A and 4B show examples of display on the unused capacity information displaying screen of the monitor;

FIG. 9 shows another example of the unused capacity information displaying screen according to Modification 4.

DESCRIPTION OF PREFERRED EMBODIMENTS

Figure 1:
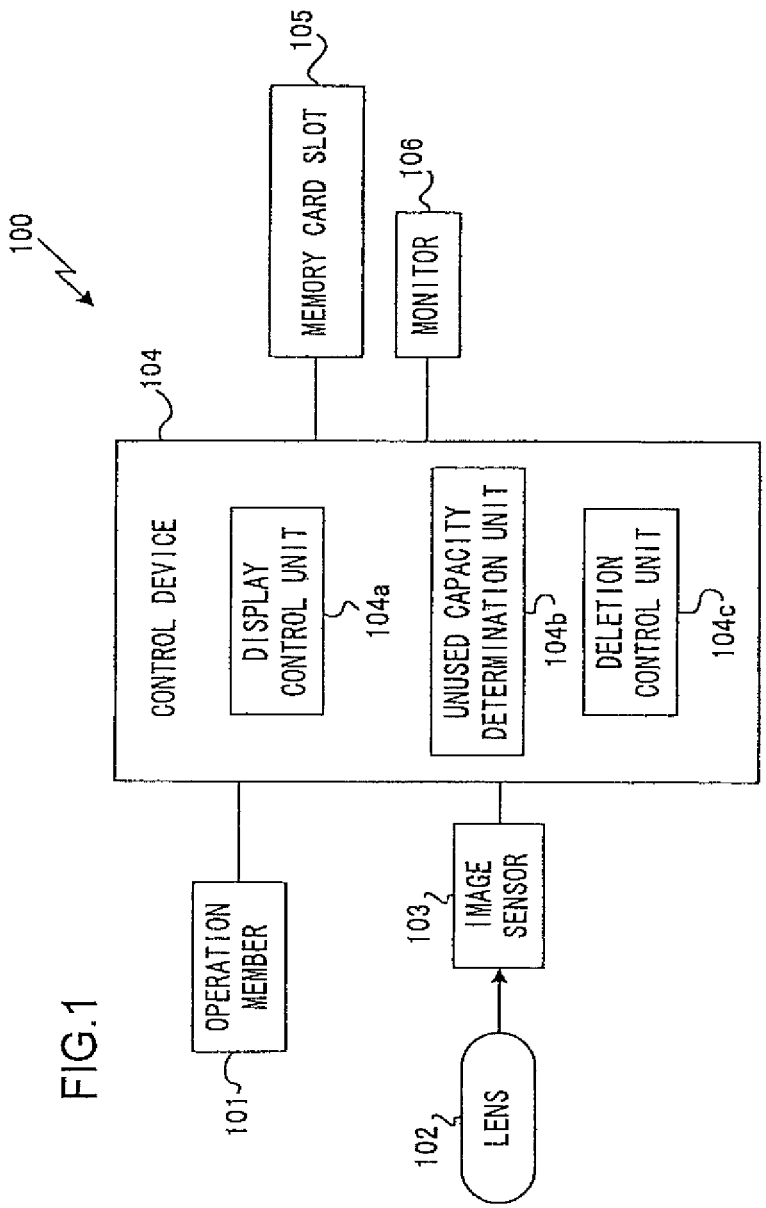
FIG. 1 is a block diagram showing the configuration of a data recording apparatus according to one embodiment of the present invention.

FIG. 1 is a block diagram showing the configuration of a data recording apparatus according to one embodiment of the present invention. The data recording apparatus may be, for example, a camera (digital camera) 100 that can record acquired image data. The camera 100 includes an operation member 101, a lens 102, an image sensor 103, a control device 104, a memory card slot 105, and a monitor 106.

The operation member 101 includes various input members to be operated by a user, for example, a power button, a shutter release switch, a zoom button, a four-way key, a decision button, a replay button, a deletion button, and a help button.

The lens 102 is constituted by a plurality of optical lenses. In FIG. 1, however, only one lens is shown as a representative. The image sensor 103 is, for example, a COD or a CMOS, which captures an image of a subject that is formed through the lens 102 and acquires image data. The image sensor 103 outputs the acquired image data to the control device 104. The control device 104 compresses the image data acquired by the image sensor 103 into a predetermined image format, for example a Jpeg format, creates an image file of a predetermined format such as Exif (Exchangeable Image File Format for Digital Still Camera), and outputs it to the memory card slot 105.

In the case of the camera 100 according to the present embodiment, the user can set in advance the image recording format, image quality, and image size as imaging conditions (image acquisition conditions) by the operation of a menu. The image recording format may be selected from a RAW format, in which the acquired image data is recorded without being subjected to the above-mentioned image processing, and the above-mentioned Jpeg format. When the selected recording format is the Jpeg format, the image quality may be selected from FINE indicating the highest image quality, NORMAL indicating a normal image quality, and BASIC indicating a low image quality.

The camera may be configured to designate the imaging condition such that an image be recorded both in the RAW format and in the Jpeg format with any one of the image quality. For example, it may be configured to designate the imaging condition such that an image is recorded both in the RAW format and in the Jpeg format with FINE (RAW+FINE). Also, it may be configured to designate the imaging condition such that an image is recorded both in the RAW format and in the Jpeg format with NORMAL (RAW+NORMAL). It may be configured to designate the imaging condition such that an image is recorded both in the RAW format and in the Jpeg format with BASIC (RAW+BASIC).

The image size, like the image quality, can be selected only when the Jpeg format is selected. It may be selected from a size L indicating the highest recording resolution, a size M indicating a second highest recording resolution, and a size S indicating the lowest recording resolution. The control device 104 performs image processing on the acquired image data based on the imaging condition designated by the user in this manner. On this occasion, the size (file size) of the image file created by the image processing may differ depending on the recording format, image quality, and image size of image as mentioned above. That is, the file size of the image file in the RAW format is greater than the file size of the image file in the Jpeg format. The file size of the image file is greater when the image is of a higher quality and further when the image size is greater.

For example, the file sizes according to respective recording formats, image qualities, and image sizes are as shown in FIG. 2. Note that in the example shown in FIG. 2, only RAW+BASIC is exemplified from among RAW+FINE, RAW+NORMAL, and RAW+BASIC. The unit of image sizes is MB. FIG. 2 illustrates that the file size per image is 11 MB because it is impossible to change the setting of image quality and image size (recording resolution) for images of the RAW format as mentioned above. In the case where the image is in the JPEG format and the image quality thereof is FINE, the file size is 7.3 MB when the image size is L, 4.1 MB when the image size is M, and 1.9 MB when the image size is S. Others are as illustrated.

Note that in the camera 100, image processing is performed such that images according to respective recording formats, image qualities, and image sizes can have file sizes shown in FIG. 2. However, the file sizes shown in FIG. 2 are absolutely target values and actual file sizes may more or less deviate therefrom depending on the acquired image data. For example, in the case of recording format=JPEG format and image size=L, the created actual file has a file size which may be 7.2 MB or 7.4 MB.

The memory card slot 105 is configured to receive a memory card as a recording medium and write the image file output from the control device 104 into the memory card loaded therein to record it. Also, the memory card slot 105 is configured to read in the image file recorded in the memory card to reproduce it or delete the image file recorded in the memory card based on the instruction from the control device 104.

The monitor 106 is a liquid crystal monitor (rear side monitor) mounted on the rear side of the camera 100. The monitor 106 displays various pieces of information such as an image (replayed image) recorded in the memory card and a setting menu for setting the camera 100. Also, the control device 104 acquires image data from the image sensor 103 and outputs it to the monitor 106 in chronological order. This enables the monitor 106 to display respective frames of image at a predetermined time interval. That is, the monitor 106 displays through images (live preview images).

The control device 104 includes a CPU, a memory, and other peripheral circuits and functionally includes a display control unit 104a, an unused capacity determination unit 104b, and a deletion control unit 104c. Note that the memory that constitutes the control device 104 includes, for example, a flash memory, a RAM, e.g., SDRAM.

Figure 3A:
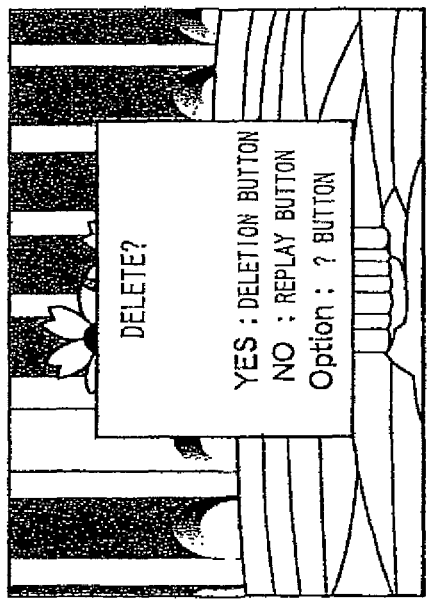
FIGS. 3A to 3C show examples of display on a confirmation screen and an unused capacity information displaying screen of the monitor.

The display control unit 104a outputs the image data recorded in the memory card to the monitor 106 based on the instruction by the user to replay and display it. When the monitor 106 displays a replay image, the user can press the deletion switch button included in the operation member 10 to delete the image file of the replay image that is being displayed from the memory card. When the deletion of the image file of the replay image is instructed by the user, the display control unit 104a controls the monitor 106 to display a confirmation screen as shown in FIG. 3A.

In the confirmation screen, there are displayed a confirmation message for asking whether or not the image file is to be deleted and an explanation to prompt operation of the button. In the example shown in FIG. 3A, "DELETE?" is displayed as the confirmation message asking whether or not the image file is to be deleted. As the explanation to prompt the operation of the button, it is indicated that when "YES" is intended as a response to the above-mentioned confirmation message, the deletion button must be pressed and when "NO" is intended as a response thereto, the replay button must be pressed. Also, it is indicated the help button (? BUTTON) must be pressed when it is intended to select "Option".

If the "Option" is selected, information on the number of frames of image that can be recorded in the memory card after deleting the image file is presented to the user. That is, when the user instructs that an image file recorded in the memory card be deleted, in many cases it is supposed that the unused capacity of the memory card is small and the user is considering deletion of the image file in order to increase the unused capacity of the memory card thereby. Taking this into account, it is configured to present information on how many frames of image will be able to be taken by deleting an image file before the user deletes it. To be concrete, the following processing is performed.

The unused capacity determination unit 104b calculates an unused capacity which will be available after deletion of an image file to be deleted (unused capacity after deletion) of the memory card when it is detected that the help button has been pressed by the user. That is, the unused capacity determination unit 104b subtracts a data size of the image file to be deleted from the unused capacity before deletion of the image file to be deleted (present unused capacity) of the memory card to calculate the unused capacity after deletion of the memory card.

Then, the unused capacity determination unit 104b calculates, based on the unused capacity of the memory card after deletion, the number of frames of image that will be able to be recorded in the memory card by deletion of the image file to be deleted. In other words, the unused capacity determination unit 104b determines how many frames of image can be taken after deleting the image file to be deleted. Then, the display control unit 104a displays an unused capacity information displaying screen that shows a result of the determination by the unused capacity determination unit 104a on the monitor 106.

In the present embodiment, the file size of the image file may vary depending on the setting state of the recording format, image quality, and image size of the image to be acquired as mentioned above. For this reason, the unused capacity determination unit 104b calculates the number of frames of image that can be recorded in the memory card (recordable frames number) depending on the presently set recording format, image quality, and image size. That is, the unused capacity determination unit 104b calculates a recordable frames number for each present setting state based on the calculated unused capacity after deletion of the memory card and the file size for each present setting state shown in FIG. 2.

For example, if the present setting state is such that recording format=Jpeg, image quality-FINE, image size=L, it is assumed that the file size per frame is 7.3 MB as shown in FIG. 2 and the recordable frames number depending on the present setting state is calculated accordingly. Note that as mentioned above, the file size shown in FIG. 2 is absolutely a target value. However, there will be no great difference between the actual file size and the target value, thus causing no problem since image processing is performed such that the file size can approach to the target value when images are acquired.

Figure 3C:
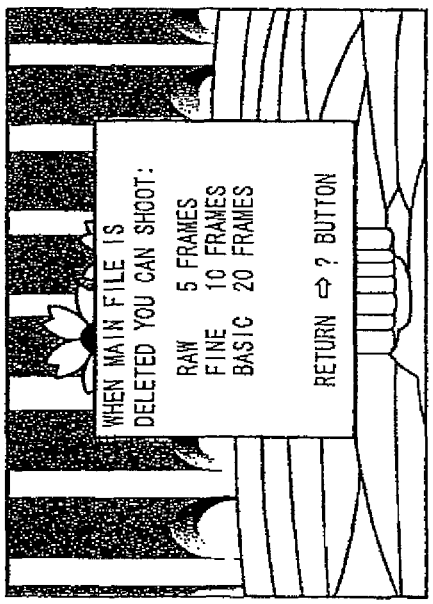
Figure 3B:
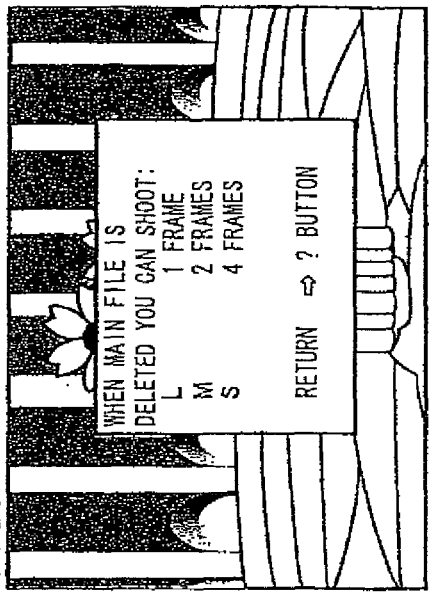

FIGS. 3B and 3C show each a specific example of an unused capacity information displaying screen shown on the monitor 106. FIG. 3B shows the example of the result of calculation of the recordable frames number shown on the monitor 106 when the calculation has been performed according to the image size in the present setting state. This shows that after the target image is deleted, the number of frames of image of the size L that can be recorded or photographed, is 5 in the RAW format, 10 in the Jpeg format with FINE image quality (FINE), or 20 in the BASIC quality. Along with this, the display shows that the process can be returned to the confirmation screen shown in FIG. 3A by pressing the help button (? BUTTON).

FIG. 3C shows the example of the result of calculation of recordable frames number shown on the monitor 106 when the calculation has been performed according to the image quality in the present setting state. This shows that after the target image is deleted, the number of frames of image in Jpeg format that can be recorded or photographed is 1 for Size L, 2 for Size M, or 4 for Size S. Along with this, the display shows that the user can return to the confirmation screen shown in FIG. 3A by pressing the help button (? BUTTON).

Note that it may be configured such that the user can freely select which one of the display formats in FIGS. 3B and 3C in which the recordable frames number is displayed. Alternatively, one of them may be set in advance.

Also, since the file size of an image file may vary depending on the setting states of the recording format, image quality, and image size of the image to be acquired as mentioned above, the unused capacity determination unit 104b may be configured to calculate the number of frames of image that can be recorded in the memory card (recordable frames number) for each setting state regardless of the present setting state. That is, the unused capacity determination unit 104b may be configured to calculate a recordable frames number for each setting based on the calculated unused capacity after deletion of the memory card and the file size for each setting state shown in FIG. 2. The display control unit 104a may be configured to display an unused capacity information displaying screen that shows recordable frames number for each setting state determined by the unused capacity determination unit 104b.

A specific example of the unused capacity information displaying screen of this instance is described with reference to FIGS. 4A and 4B. FIG. 4A shows the result of display of the recordable image frames number when the unused capacity after deletion of the image file in the memory card is 256 MB. As shown in FIG. 4A, the display control unit 104a displays a list of recordable frames numbers for each setting state in the form of a table on the monitor 106.

For example, the case of FINE, i.e., image quality FINE in the Jpeg format is described. The file size under this imaging condition is 7.3 MB at an image size of L, 4.1 MB at an image size of M, or 1.9 MB at an image size of S as shown in FIG. 2. This indicates that for the unused capacity of 256 MB, the images can be recorded in the number of 33 frames at the Size L, 58 frames at the Size M, or 125 frames at the Size S.

Also, FIG. 4B shows the result of display of recordable frames numbers when the unused capacity of the memory card after deletion of an image file is 25 MB. For example, in the case of FINE, i.e., image quality FINE in the Jpeg format, the images can be recorded in the number of 3 frames at the Size L, 6 frames at the Size M, or 13 frames at the Size S for the unused capacity of 25 MB.

In this manner, the user can know in advance how many frames of image taken can be recorded in the memory card by pressing the help button, when the confirmation screen shown in FIG. 3A is displayed, to display the unused capacity information displaying screen shown in FIG. 3B, 3C, 4A, or 43. Then, the user can determine whether or not the target image for deletion is to be actually deleted after confirming the number of frames of image that can be taken That is, when a recording capacity sufficient for the number of frames of image taken the user desires to record in the memory card can be secured, that is, when the number of frames of image that the user desires can be taken by deleting the target image, the user can return to the confirmation screen shown in FIG. 3A and press deletion button while the confirmation screen is being displayed to perform deletion of the target image. On the contrary, when a recording capacity sufficient for the number of frames of image taken the user desires to record in the memory card cannot be secured, that is, when the number of frames of image that the user desires cannot be taken by deleting the target image, the user can return to the confirmation screen shown in FIG. 3A and press a replay button while the confirmation screen is being displayed to cancel deletion of the target image.

The deletion control unit 104c deletes the target image file from the memory card when the deletion button is pressed down by the user to instruct deletion of the target image while the confirmation screen is being displayed. This enables the unused capacity in the memory card to be increased.

Figure 5:
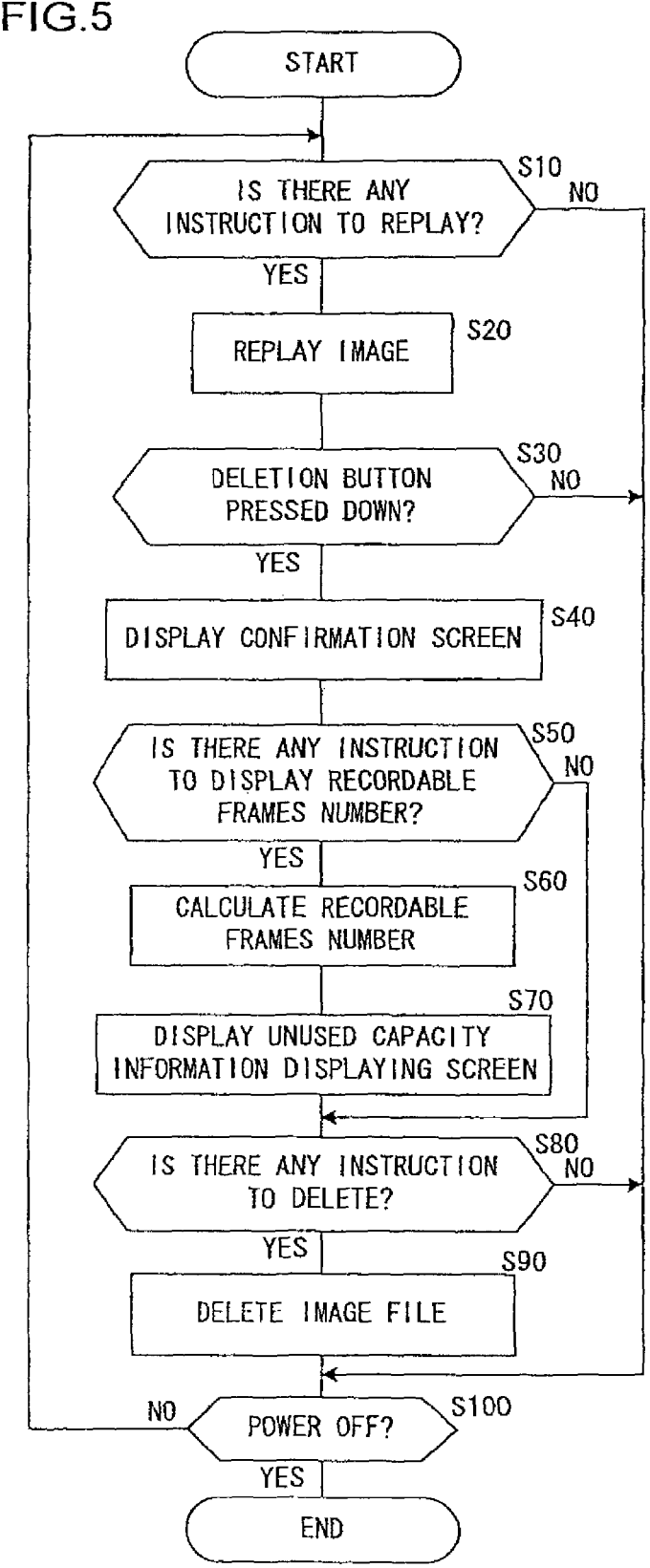
FIG. 5 is a flowchart illustrating the processing by the camera.

FIG. 5 is a flowchart illustrating the processing by the camera 100 according to the present embodiment. The processing shown in FIG. 5 is performed according to a program that is launched when the power of the camera 100 is turned on and executed by the control device 104.

In a step S10, the display control unit 104a determines whether or not the replay button included in the operation member 101 is pressed by the user to instruct replay of the image recorded in the memory card. If the result of the determination in the step S10 is NO, the process is advanced to a step S100. On the contrary, if the result of the determination in the step S10 is YES, the process is advanced to a step S20.

In the step S20, the display control unit 104a outputs the image recorded in the memory card to the monitor 106 to replay it thereon. Note that when the four-way key is operated by the user, the display control unit 104a sequentially switches the images to be displayed on the monitor 106 in response to the content of the operation. Thereafter, the process is advanced to a step S30.

In the step S30, the display control unit 104a determines whether or not the deletion button is pressed to instruct deletion of the image being replayed. If the result of the determination in the step S30 is NO, the process is advanced to a step S100 to be detailed later. On the contrary, if the result of the determination in the step S30 is YES, the process is advanced to a step S40, where the display control unit 104a displays the confirmation screen shown in FIG. 3A on the monitor 106 and the process is advanced to a step S50.

In the step S50, the unused capacity determination unit 104b determines whether or not the help button is pressed by the user while the confirmation screen is being displayed to instruct the number of frames of image that can be taken to be displayed, i.e., the unused capacity information displaying screen to be displayed. If the result of the determination in the step S50 is NO, the process is advanced to a step S80 to be detailed later. On the contrary, when the result of the determination in the step S50 is YES, the process is advanced to the step S60. In the step S60, the unused capacity determination unit 104b calculates the unused capacity of the memory card after the target image file is deleted (unused capacity after deletion) in the same manner as mentioned above. Then, the unused capacity determination unit 104b calculates the recordable frames number of the memory card after deletion of the target image file to be deleted based on the unused capacity after the deletion and the file size according to each setting state. Thereafter, the process is advanced to a step S70.

In the step S70, the display control unit 104a displays on the monitor 106 the unused capacity information displaying screen shown in FIG. 3B, 3C, 4A or 4B based on the calculated recordable frames number calculated by the unused capacity determination unit 104b. Thereafter, the process is advanced to a step S80 and the deletion control unit 104c determines whether or not the deletion button is pressed by the user while the confirmation screen shown in FIG. 3A is being displayed. If the result of the determination in the step S80 is NO, the process is advanced to a step S100 to be detailed alter. On the contrary, if the result of the determination in the step S80 is YES, the process is advanced to a step S90 and the deletion control unit 104c deletes the target image from the memory card and the process is advanced to the step S100.

In the step S100, the control device 104 determines whether or not the power of the camera 100 is turned OFF. If the result of the determination in the step S100 is NO, The process is returned to the step S10 and the processing is repeated. On the other hand, if the result of the determination in the step s100 is YES, the processing is ended.

According to the present embodiment as mentioned above, the following operational effects can be obtained.

(1) After the acquired image data is subjected to image processing such that the data size thereof (acquired data size) approaches to the predetermined data acquisition condition, that is, data size corresponding to the recording format, image quality, and image size, the image file is recorded in the memory card as a recording medium. On this occasion, deletion target data that is to be deleted is specified from among the image files recorded in the memory card based on the instruction by the user and a data size of the specified deletion target file (deletion data size) is acquired. Then, the number of image files that can be recorded by deletion of the deletion target file (recordable data amount) is calculated based on the remaining capacity of the memory card, deletion data size, and acquired data size. The result of the calculation is displayed on the monitor 106. With this configuration, the user can know how many frames of image can further be taken by deleting the image file concerned before the deletion target image file is actually deleted.

(2) The unused capacity determination unit 104b is configured to calculate a number of image files that can be recorded for each image acquisition condition and display it.
With this configuration, the user can know the number of frames of image that can be taken by deletion of the deletion target image file for each acquisition condition.

—Modification—

Note that the data recording apparatus according to the above-mentioned embodiment can be modified as follows.

(1) In the above-mentioned embodiment, explanation has been made on an example in which the camera (digital camera) 100 capable of recording image data is used as the data recording apparatus. However, the present invention is also applicable to other devices and apparatus that record data other than image data, such as dynamic image data and voice data in a recording medium, for example, video cameras, cellular phones, and IC recorders and the like.

(2) In the above-mentioned embodiment, explanation has been made on the example in which when deletion of a replay image is instructed by the user, the confirmation screen shown in FIG. 3A is displayed and if the help button is pressed while the confirmation screen is being displayed, the unused capacity information displaying screen is displayed on the monitor 106. However, the operation button to be operated for displaying the unused capacity information displaying screen is not limited to the help button but may be other buttons.

When the button is operated by the user while the confirmation screen is being displayed, the unused capacity information displaying screen is displayed. Not only that, for example, when the remaining capacity of the memory card is small and if deletion of the replay image is instructed by the user, the information on the number of recordable frames of image may be displayed. On this occasion, the display control unit 104a may be configured to determine that the remaining capacity of the memory card is small when the remaining capacity of the memory card is 10% or less of the total capacity and display the unused capacity information displaying screen.

(3) In the above-mentioned embodiment, explanation has been made on the example in which the image file is recorded in the memory card as a recording medium. However, the present invention is also applicable to other recording media or recording devices such as a flash memory or hard disk drive built into the camera 100.

(4) In the above-mentioned embodiment, explanation has been made on the example in which the user confirms the recordable frames number to be obtained after the deletion target image is deleted on the unused capacity information screen and then returns to the confirmation screen and again presses the deletion button to delete the image.
However, it may be configured such that the image is deleted by pressing the deletion button while the unused capacity information screen is being displayed. On this occasion, it may be configured such that when any one of the recordable frames numbers displayed on the unused capacity information displaying screen is selected and the deletion button is pressed, the deletion target image is deleted and the imaging condition (data acquisition condition) of the camera 100 is automatically set to a condition that corresponds to the selected recordable frames number.

For example, explanation is made on the example in which the present imaging condition is such that recording format=JPEG format, image quality=FINE, and image size=L. On this occasion, if the deletion button is pressed after "5 FRAMES", which is the recordable frames number of the RAW image is selected on the unused capacity information displaying screen shown in FIG. 3B, the image is deleted and the setting of the image recording format is changed from Jpeg to RAW.
If the deletion button is pressed after "2 FRAMES", which is the recordable frames number of Size M image, is selected on the unused capacity information displaying screen shown in FIG. 3C, the image is deleted and the size of the image to be acquired is changed from L to M.

If the deletion button is pressed after "216 FRAMES", which is the recordable frames number of BASIC Size M image, is selected on the unused capacity information displaying screen shown in FIG. 4A, the image is deleted and then the image quality of the image to be acquired is changed from FINE to BASIC and the size of the image to be acquired is changed from L to M. With this configuration, the user can perform deletion of image and change of setting of imaging condition of the camera 100 simultaneously only by selecting the number of frames the user wants to take on the unused capacity information displaying screen.

(5) In the above-mentioned embodiment, the image that is being replayed is made a target of deletion and the recordable frames number after the image is deleted is enabled to be displayed. However, a plurality of deletion target images is selected and the recordable frames number after the selected images are deleted may be displayed. On this occasion, the data size of the image files of the selected plurality of deletion target images is subtracted from the unused capacity (present unused capacity) of the memory card before deletion of the image files of the selected plurality of deletion target images to calculate unused capacity of the memory card after deletion. The processing for selecting the plurality of deletion target images is explained in detail in Modification 2.

(6) In the above-mentioned embodiment, the data size of the image file of the deletion target image is subtracted from the unused capacity (present unused capacity) of the memory card before deletion of the image file of the deletion target image to calculate unused capacity of the memory card after deletion. Then, the recordable frames number of the memory card after deletion of the image file of the deletion target image is calculated based on the unused capacity and the file size for each setting state. However, an increase in unused capacity after deletion of an image file may be calculated based on the data size of the image file of the deletion target image. On this occasion, the recordable frames number of the memory card that increases after deletion of the image file of the deletion target image can be calculated based on the unused capacity and the file size for each setting state. The user can directly know a recordable frames number that increases as a result of deletion of the image file of the deletion target image.

Note that the present invention is not limited to the configuration in the above-mentioned embodiment as far as the characteristic functions of the present invention are not damaged.

—Modification 2—

Modification 2 of the above-mentioned embodiment is described below. The configuration of the data recording apparatus according to Modification 2 is the same as that of the embodiment shown in FIG. 1. The data recording apparatus according to Modification 2 is configured such that a plurality of frames of deletion target images can be selected. To be concrete, when the user selects a plurality of frames of image he or she wants to delete on a thumbnail screen that displays a list of a plurality of images, the recordable frames number of the memory card after deletion of the selected plurality of frames of image is displayed.

Figure 6:
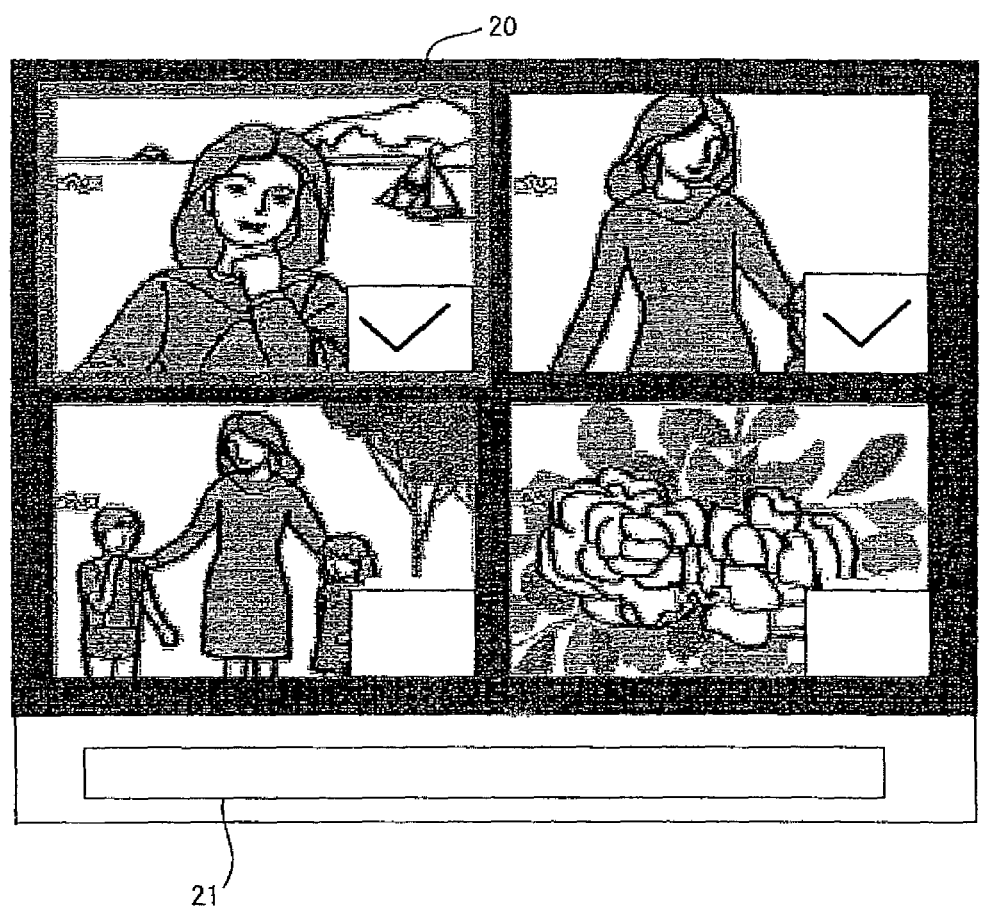
FIG. 6 shows an unused capacity information displaying screen according to Modification 2.

When the operation member 101 is operated by the user, the display control unit 104*a* outputs a plurality of images recorded in the memory card to the monitor 106 and replays them thereon. On the thumbnail screen, the user can select a desired image by operating the four-way key. FIG. 6 shows an example of the thumbnail display screen that displays a list of four images. In the thumbnail display screen shown in FIG. 6, a cursor 20 is put on the upper left image and the upper left image and the upper right image are selected.

When the deletion button is pressed by the user in this state, the display control unit 104*a* judges that deletion of the selected image is instructed and displays an unused capacity information displaying unit 21 in the thumbnail display screen as shown in FIG. 6. Note that the unused capacity information displaying unit 21 may be displayed as popup in response to the instruction to delete the image or displayed on the lower part of the thumbnail display screen so as not to overlap the thumbnail images.

The unused capacity information displaying unit 21 displays how many frames of image will be able to be recorded in the memory card by deleting the selected plurality of images.
The contents of display of the unused capacity information displaying unit 21 are shown as follows.

(1) In the unused capacity information displaying unit 21, there is displayed the unused capacity of the memory card before deletion of the image file of the deletion target image, more particularly the recordable frames number according to the present imaging condition. Further, in the unused capacity information displaying unit 21, there is displayed the unused capacity of the memory card after the image file of the selected deletion target image is deleted, more particularly the recordable frames number according to the present imaging condition. The unused capacity information displaying unit 21 displays either the recordable frames number of the memory card in whole when the deletion target image is deleted or the recordable frames number that increases when the deletion target image is deleted.

(2) The unused capacity information displaying unit 21 displays the unused capacity of the memory card before the image file of the deletion target image is deleted, more particularly the recordable frames number according to the present imaging condition. Further, the unused capacity information displaying unit 21 displays the unused capacity of the memory card when the image file of the selected deletion target image is deleted, more particularly the recordable frames number under an image condition for rendering the data size the smallest. The image condition under which the data size is the smallest is that recording format=JPEG format, image quality=BASIC, and image size=S. By displaying the recordable frames number under the condition for rendering the data size the smallest, the greatest number of frames that can be recorded in the memory card when the deletion target image is deleted can be informed to the user.

(3) The unused capacity information displaying unit 21 displays the recordable frames number for each imaging condition when the selected deletion target image is deleted. For example, the unused capacity information displaying unit 21 displays the recordable frames number when the recording format is RAW format, the recordable frames number when the recording format is JPEG format and the image quality is FINE, and the recordable frames number when the recording format is JPEG format and the image quality is BASIC.

In this manner, by displaying the recordable frames number when a plurality of deletion target images is deleted, the user can readily know how many images can be recorded in the memory card by deletion of these images.

Note that the unused capacity information displaying unit 21 may be configured to display the unused capacity of the memory card created by deletion of the deletion target image instead of the recordable frames number. Also, it may be configured such that when the present operation mode of the digital camera 100 is a still image imaging mode, the unused capacity information displaying unit 21 displays the number of still images that can be taken and when the operation mode is a movie shooting mode, the unused capacity information displaying unit 2 displays a time in which a dynamic image can be taken (second or minute).

—Modification 3—

In the data recording apparatus according to Modification 3, as explained in Modification 2, when a plurality of deletion target images is selected the deletion target images are deleted and concomitantly the imaging condition (data acquisition condition) of the digital camera 100 is automatically set to a condition that corresponds to the selected recordable frames number.

Figure 7B:
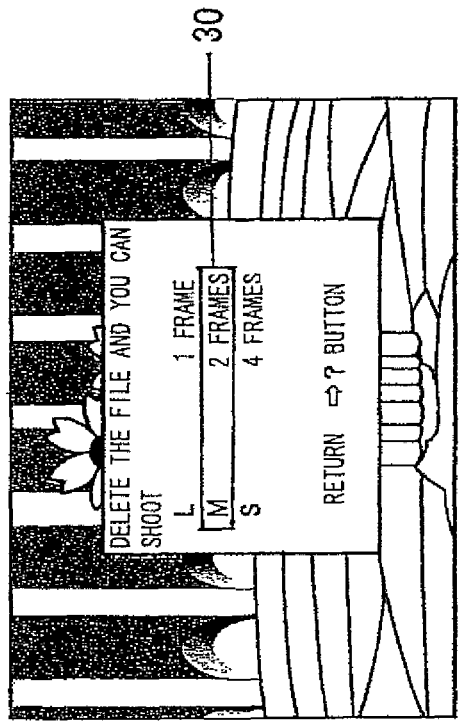
FIGS. 7A and 7B show each an unused capacity information displaying screen according to Modification 3.
Figure 7A:
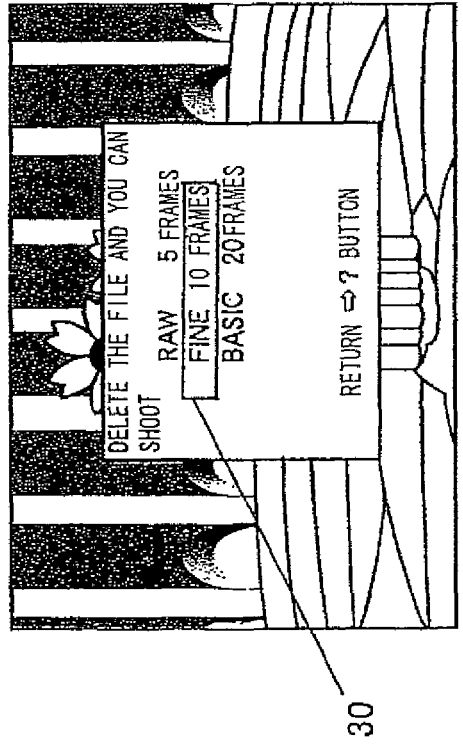

For example, when the deletion button is pressed after a plurality of deletion target images is selected, the unused capacity information displaying screen as shown in FIG. 7A is displayed on the monitor 106. On the unused capacity information displaying screen as shown in FIG. 7A, a cursor 30 is put on FINE that shows the image quality presently set. The user moves the cursor 30 by operating the four-way key to select a desired image quality and presses the decision button. When the user presses the deletion button in this state, the plurality of the selected deletion target images is deleted and concomitantly the image quality of the image to be acquired is changed from the present image quality to freshly selected image quality.

Also, it may be configured such that when the deletion button is pressed after a plurality of deletion target images is selected, the unused capacity information displaying screen as shown in FIG. 7B is displayed on the monitor 106.

In the unused capacity information displaying screen as shown in FIG. 7B, the cursor 30 is put on "M" that indicates the image size presently set. The user moves the cursor 30 by operating the four-way key to select a desired image size and presses the decision button. When the user presses the deletion button in this state, the plurality of the selected deletion target images is deleted and concomitantly the image size of the image to be acquired is changed from the present image size to a freshly selected image size.

Note that it may be configured as follows. The unused capacity information displaying screen shown in FIG. 7A and the unused capacity information displaying screen shown in FIG. 7B may be switched over. Then, after selecting the image quality and image size, the selected plurality of deletion target images is deleted.

—Modification 4—

Modification 4 of the data recording apparatus according to the above-mentioned embodiment is described below. The configuration of the data recording apparatus according to Modification 4 is the same as that of the embodiment shown in FIG. 1. In Modification 4, the recordable frames number after the RAW development is performed by the digital camera 100 is displayed. The RAW development is processing in which an image of RAW format recorded without image processing (RAW image) is complemented in the digital camera 100 to perform image processing such as gradation correction and white balance adjustment to create a new image of JPEG format, which image is then recorded.

When the RAW development is performed in the digital camera 100, the remaining capacity of the memory card decreases since the image of JPEG format created by the RAW development is recorded in the memory card. Accordingly, before the RAW development is actually performed, the user is informed of how much unused capacity of the memory card remains after the RAW development.

Figure 8:
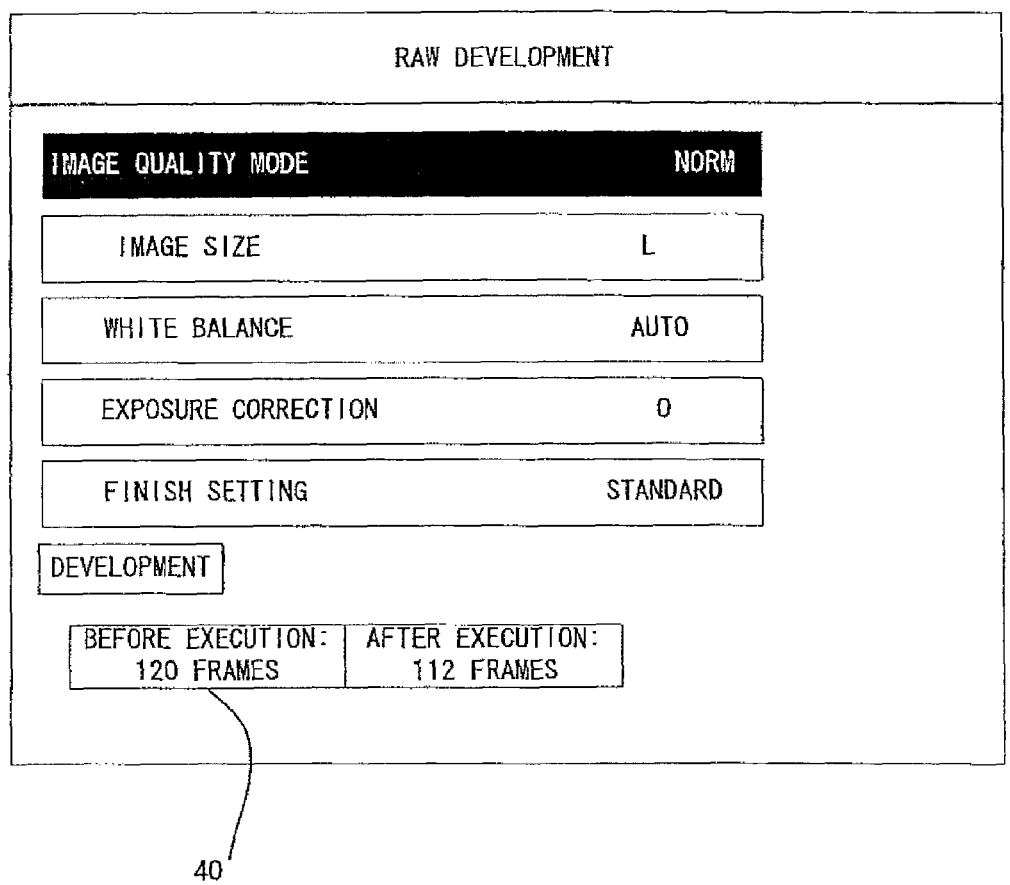
FIG. 8 shows an unused capacity information displaying screen according to Modification 4.

The display control unit 104a displays the RAW development menu screen as shown in FIG. 8 on the monitor 106 in response to the operation of the operation member 101 by the user. As shown in FIG. 8, five parameters that can be set in the RAW development are displayed in the RAW development menu screen. That is, on the RAW development menu screen, the image quality mode, image size, white balance, exposure correction, and finish setting after the RAW development can be selected.

The image quality mode includes, FINE, NORM, and BASIC. The image size includes Size L, Size M, and Size S. The white balance includes AUTO, TUNGSTEN, FLUORESCENT, DAYLIGHT, FLASH, CLOUDY, SHADOWY and PRESET MANUAL. The exposure correction can be set within the range of −3 to +3. The finish setting includes, STANDARD, SOFT, SHARP, SHARPER, PORTRAIT, BLACK AND WHITE, and CUSTOMIZE.

The unused capacity determination unit 104b calculates the remaining capacity of the memory card when RAW development is performed under the condition set on the RAW development menu screen. To be concrete, the number of frames that can be recorded in the memory card after the RAW development is calculated according to the file size shown in FIG. 2 based on the image quality mode and image size set for the RAW development.

FIG. 9 shows an example of the unused capacity information displaying screen that displays a recordable frames number for each setting state of the RAW development. FIG. 9 shows a recordable frames number after one frame of image is RAW-developed when the present imaging conditions of the digital camera 100 are set such that recording format=JPEG format, image quality=NORM, and image size=S and the present remaining capacity of the memory card is 120 MB. For example, if the RAW development is performed by setting the imaging conditions such that the image quality mode is NORM and the image size is S in the same manner as in the present imaging conditions, the number of recordable frames number after RAW development is 119 under the present imaging conditions. On the other hand, if the RAW development is performed by setting the image mode to FINE and the image size to L, the recordable frames number after the RAW development is 112 under the present imaging conditions.

As shown in FIG. 8, it may be configured such that an unused capacity information displaying unit 40 is provided below the RAW development menu screen and the recordable frames number after RAW development based on the image quality mode and image size set for the RAW development is displayed in the unused capacity information displaying unit 40. On this occasion, the recordable frames number under the present imaging conditions before the RAW development and the recordable frames number under the present imaging conditions after the RAW development are displayed in, for example, the unused capacity information displaying unit 40.

It may be configured such that when the item of image quality mode is selected on the RAW development menu screen shown in FIG. 8, an unused capacity information displaying screen that displays a recordable frames number for each image quality mode is displayed. For example, when the item of image quality mode is selected by the operation of the operation member 101 by the user on the RAW development menu screen, the unused capacity information displaying screen as shown in FIG. 10A is displayed on the monitor 106.

Also, it may be configured such that when the item of image size is selected on the RAW development menu screen shown in FIG. 8, the unused capacity information displaying screen that displays a recordable frames number for each image size is displayed. For example, when the item of image size is selected by the operation of the operation member 101 by the user on the RAW development menu screen, the unused capacity information displaying screen as shown in FIG. 10B is displayed on the monitor 106.

Figure 10A:
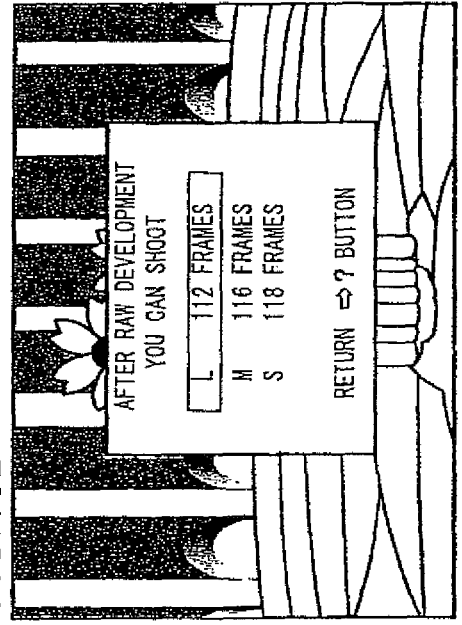
FIGS. 10A and 10B show each still another example of the unused capacity information displaying screen according to Modification 4.
Figure 10B:
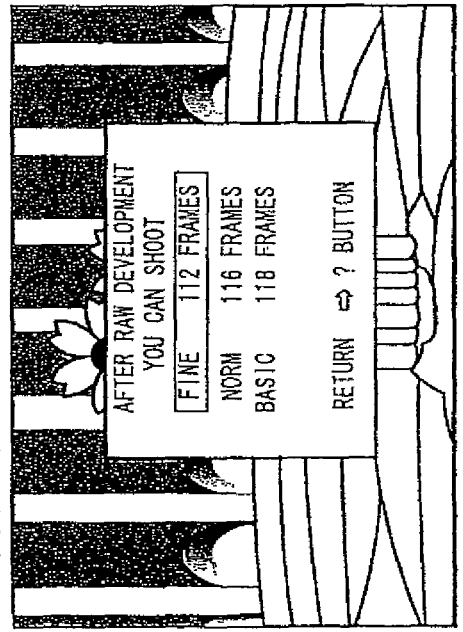

It may be configured to preset or allow the user to select according to his or her preference which one of the unused capacity information displaying unit 40 shown in FIG. 8, the unused capacity information displaying screen shown in FIG. 9, and the unused capacity information displaying screens shown in FIGS. 10A and 10B is to be displayed.

The above explanation has been made on the example in which one frame of RAW-developed image is created under the conditions set on the RAW development menu screen. Note that the recordable frames number after the RAW development when a plurality of frames of RAW-developed images is created under the same conditions may be displayed on the unused capacity information displaying screen.

Modification 4 may be combined with the above-mentioned embodiments to Modification 3. That is, the data recording apparatus may be configured to be provided with a function of displaying the recordable frames number that indicates the number of frames the data recording apparatus can record in the memory card by deletion of the deletion target image before deletion is actually performed and a function of displaying before the RAW development is actually performed the recordable frames number that indicates the number of frames the data recording apparatus can record in the memory card after the RAW development.

As described above, when data processing of data recorded in the recording medium is performed based on the instruction by the user, the data recording apparatus according to the embodiment of the present invention or any one of modifications thereof displays on the display device the number of pieces of data that can be recorded in the recording medium by performing the data processing before the data processing is actually performed. This enables the user to know the recordable frames number after data processing before the data processing is actually performed. The data processing includes at least one of processing of deleting data from the recording medium and processing of creating new data based on the data recorded in the recording medium and recording it into the recording medium.

According to the embodiments of the present invention, the user can know in advance the number of pieces of data that can be recorded by performing the data processing.

The above-described embodiments are examples and various modifications can be made without departing from the scope of the invention.

What is claimed is:

1. An imaging device comprising:
   a setting portion that sets a shooting condition;
   an imaging portion that images an object and generates image data, based on the shooting condition set by the setting portion;
   a recording control portion that records image files including the image data in a recording medium;
   a deletion target image file specifying portion that specifies a deletion target image file among the image files recorded in the recording medium;
   a deletion operating portion that is operated by a user when the deletion target image file specified by the deletion target image file specifying portion is deleted from the recording medium;
   a deletion control portion that deletes the deletion target image file specified by the deletion target image file specifying portion from the recording medium, in response to the deletion operating portion having been operated by the user;
   a display control portion that displays (i) a first recordable number and (ii) a second recordable number on a display portion in a state in which the deletion target image file specified by the deletion target image file specifying portion is not deleted from the recording medium by the deletion control portion, wherein (i) the first recordable number is a number of image files including image data generated based on a first shooting condition that can be recorded to the recording medium when the deletion target image file is deleted from the recording medium by the deletion control portion, and (ii) the second recordable number is a number of image files including image data generated based on a second shooting condition, different from the first shooting condition, that can be recorded to the recording medium when the deletion target image file is deleted from the recording medium by the deletion control portion;
   a recordable number specifying portion that specifies either the first recordable number or the second recordable number displayed on the display portion by the display control portion; and
   a control portion that controls such that
      (i) the deletion control portion deletes the deletion target image file from the recording medium in response to the deletion operating portion having been operated by the user in a state in which
         (a) the first and second recordable numbers are displayed on the display portion by the display control portion and
         (b) the first recordable number is specified by the recordable number specify portion, and the setting portion sets the first shooting condition when the shooting condition set by the setting portion is not the first shooting condition, and
      (ii) the deletion control portion deletes the deletion target image file from the recording medium in response to the deletion operating portion having been operated by, the user in a state in which
         (a) the first and second recordable numbers are displayed on the display portion by the display control portion and
         (b) the second recordable number is specified by the recordable number specifying portion, and the setting portion sets the second shooting condition when the shooting condition set by the setting portion is not the second shooting condition.

2. The imaging device as set forth in claim 1, wherein both the first and second shooting conditions are related to image quality.

3. The imaging device as set forth in claim 1, wherein both the first and second shooting conditions are related to image size.

4. The imaging device as set forth in claim 1, further comprising:
   a raw development target image file specifying portion that specifies a raw development target image file among the image files recorded to the recording medium; and
   a raw development control portion that performs raw development to the raw development target image file specified by the raw development target image file specifying portion,
   wherein the display control portion displays (i) a third recordable number and (ii) a fourth recordable number on the display portion in a state in which raw development by the raw development control portion has not been performed to the raw development target image file specified by the raw development target image file specifying portion, and (i) the third recordable number is a number of image files, including image data generated based on the shooting condition set by the setting portion when the raw development has been performed, based on a first development condition, to the raw target image file by the raw development control portion, that can be recorded to the recording medium and (ii) the fourth recordable number is a number of image files, including image data generated based on the shooting condition set by the setting portion when the raw development has been performed, based on a second development condition, to the raw development target image file by the raw development control portion, that can be recorded to the recording medium.

5. The imaging device as set forth in claim 4, wherein both the first and second development conditions are related to image quality.

6. The imaging device as set forth in claim 4,
wherein both the first and second development conditions are related to image size.

7. An imaging device comprising:

a setting portion that sets a shooting condition;

an imaging portion that images an object and generates image data, based on the shooting condition set by the setting portion;

a recording control portion that records image files including the image data in a recording medium;

a deletion target image file specifying portion that specifies a deletion target image file among the image files recorded in the recording medium;

a deletion operating portion that is operated by a user when the deletion target image file specified by the deletion target image file specifying portion is deleted from the recording medium;

a deletion control portion that deletes the deletion target image file specified by the deletion target image file specifying portion from the recording medium, in response to the deletion operating portion having been operated by the user;

a display control portion that displays (i) a first recordable number and (ii) a second recordable number on a display portion in a state in which the deletion target image file specified by the deletion target image file specifying portion is not deleted from the recording medium by the deletion control portion, wherein (i) the first recordable number is a number of image files including image data generated based on a first shooting condition that can be recorded to the recording medium when the deletion target image file is deleted from the recording medium by the deletion control portion, and (ii) the second recordable number is a number of image files including image data generated based on a second shooting condition, different from the first shooting condition, that can be recorded to the recording medium when the deletion target image file is deleted from the recording medium by the deletion control portion;

a raw development target image file specifying portion that specifies a raw development target image file among the image files recorded to the recording medium; and a raw development control portion that performs raw development to the raw development target image file specified by the raw development target image file specifying portion, wherein the display control portion displays (i) a third recordable number and (ii) a fourth recordable number on the display portion in a state in which raw development by the raw development control portion has not been performed to the raw development target image file specified by the raw development target image file specifying portion, and (i) the third recordable number is a number of image files, including image data generated based on the shooting condition set by the setting portion when the raw development has been performed, based on a first development condition, to the raw target image file by the raw development control portion, that can be recorded to the recording medium and (ii) the fourth recordable number is a number of image files, including image data generated based on the shooting condition set by the setting portion when the raw development has been performed, based on a second development condition, to the raw development target image file by the raw development control portion, that can be recorded to the recording medium.

8. The imaging device as set forth in claim 1,
wherein a first state of deletion operating portion relates to (a) the first and second recordable numbers are displayed on the display portion by the display control portion, and (b) the first recordable number is specified by the recordable number specifying portion;

wherein a second state of deletion operating portion relates to (a) the first and second recordable numbers are displayed on the display portion by the display control portion, and (b) the second recordable number is specified by the recordable number specifying portion;

wherein in response to the deletion of the target image file while the deletion operating portion is in the first state, the setting portion automatically sets the first shooting condition when the shooting condition set by the setting portion is not the first shooting condition; and wherein in response to the deletion of the target image file while the deletion operating portion is in the second state, the setting portion automatically sets the second shooting condition when the shooting condition set by the setting portion is not the second shooting condition.

\* \* \* \* \*